Figure 1:
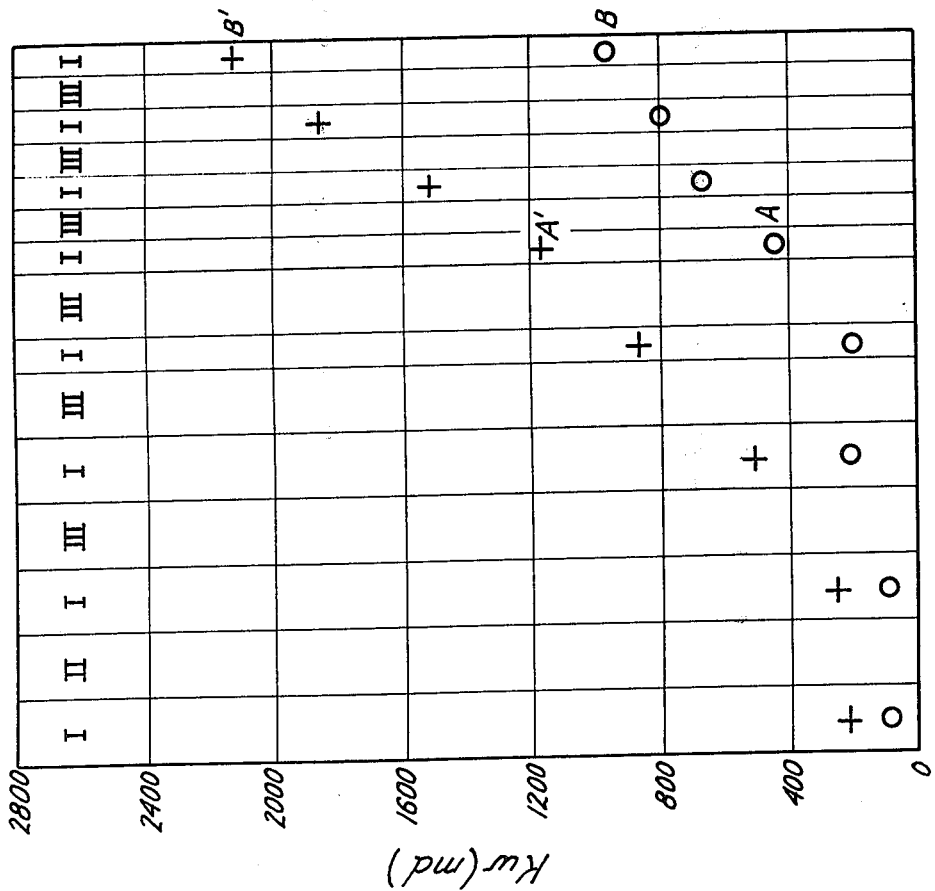

United States Patent [19]
Tate

[11] 3,927,717
[45] Dec. 23, 1975

[54] SECONDARY RECOVERY PROCESS UTILIZING POLYVINYLPYRROLIDONES

[75] Inventor: Jack F. Tate, Houston, Tex.
[73] Assignee: Texaco Inc., New York, N.Y.
[22] Filed: Dec. 20, 1973
[21] Appl. No.: 427,002

[52] U.S. Cl. ............................ 166/271; 166/274
[51] Int. Cl.² ........................................ E21B 43/26
[58] Field of Search .................. 166/271, 274, 307; 252/8.55 C

[56] References Cited
UNITED STATES PATENTS

| | | | |
|---|---|---|---|
| 2,094,479 | 9/1937 | Vandergrift | 166/271 |
| 2,804,145 | 8/1957 | Holbrook | 166/271 |
| 2,885,004 | 5/1959 | Perry | 166/271 |
| 3,179,171 | 4/1965 | Beale | 252/8.55 C |
| 3,294,765 | 12/1966 | Hort et al. | 166/307 |
| 3,434,971 | 3/1969 | Atkins | 166/307 |
| 3,483,923 | 12/1969 | Darley | 166/271 |
| 3,749,169 | 7/1973 | Tate | 166/274 |
| 3,757,863 | 9/1973 | Clampitt et al. | 166/271 |
| 3,794,117 | 2/1974 | Knox et al. | 166/307 |

*Primary Examiner*—Ernest R. Purser
*Assistant Examiner*—Jack E. Ebel
*Attorney, Agent, or Firm*—Thomas H. Whaley; Carl G. Ries; Walter D. Hunter

[57] ABSTRACT

Significant improvement in the recovery of hydrocarbons from a subterranean hydrocarbon-bearing formation is accomplished by injecting into the formation via an injection well drilled into a formation communicating with an adjacent producing well and containing sandstone and clay components an aqueous solution of a mineral acid and a fluorine-containing acid or salt and having dissolved therein a vinylpyrrolidone polymer whereupon the acid solution reacts with the acid-soluble components of the formation creating passageways thus facilitating the flow of fluids therein and thereby increasing the recovery of hydrocarbons from the formation through the adjacent production well.

7 Claims, 2 Drawing Figures

INCREASE IN PERMEABILITY OF BEREA SANDSTONE CORE BY MUD ACID VS RETARDED MUD ACID (1% PVP)

○ 6% HF - 12% HCl - 1% PVP
+ 6% HF - 12% HCl
I DISTILLED WATER
II 3M HCl
III 6% HF - 12% HCl OR 6% HF - 12% HCl - 1% PVP

REACTION RATE DATA FOR GLASS SLIDE ETCHING TESTS

SECONDARY RECOVERY PROCESS UTILIZING POLYVINYLPYRROLIDONES

FIELD OF THE INVENTION

This invention relates to a process for the recovery of hydrocarbons from subterranean hydrocarbon-bearing formation containing sandstone and clay components in which the permeability and porosity of the formation communicating between the producing well and adjacent injection well are increased by treating with an aqueous solution of a mineral acid and fluorine-containing acid or salt and having dissolved therein a vinylpyrrolidone polymer thereby facilitating the flow of fluids through the formation resulting in increased hydrocarbon recovery via the production well.

DESCRIPTION OF THE PRIOR ART

In recovering oil from oil-bearing reservoirs it usually is possible to recover only a minor part of the original oil in place by the primary recovery methods which utilize the natural forces present in the reservoir. As a result, a variety of supplemental recovery techniques have been utilized to increase the recovery of oil from subterranean hydrocarbon-bearing reservoirs or formation. Although these supplemental techniques are commonly referred to as secondary recovery operations in fact they may be primary or tertiary in sequence of employment. In such techniques, a fluid is introduced into the formation in order to displace the oil therein to a suitable production system through which the oil may be withdrawn to the surface of the earth. Examples of displacing mediums include gas, aqueous liquids such as fresh water or brine, oil-miscible liquids such as butane, or a water and oil-miscible liquid such as an alcohol. Generally, the most promising of the secondary recovery techniques is concerned with the injection into the formation of an aqueous flooding medium either alone or in combination with other fluids.

In the application of these conventional procedures for the production of hydrocarbons from similar formations by the secondary recovery method of water-injection, one of the principal difficulties that has been encountered is the generally low production response realized because of the low permeabilities and the consequent low rate of water acceptance of the communicating formation. Thus, these unfavorably low responses both in injection rate and in overall production have led to the abandonment of hydrocarbon production by water-injection methods from many formations containing sandstone and clay components after only a minimal amount of the oil-in-place has been produced.

Treatment of sandstone formations by mixed hydrochloric-hydrofluoric acids has been used in the past as a means of removing damage caused by the presence of clays either originally present in the formation or introduced into the formation during drilling operations. The removal of such clays is accomplished by dissolution by reaction with the hydrofluoric acid:

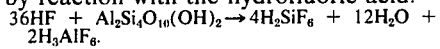
$2H_3AlF_6$.

Furthermore, the hydrofluoric acid component of the mixed acid will react with the sand and other siliceous minerals according to the following equation:

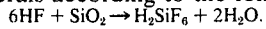

The dissolution of both clays and siliceous material can materially increase the permeability and porosity of the formation and enhance the injectivity of wells utilized in secondary recovery operations. Although treatment of the formation in the vicinity of the injection well bore usually results in an increase in the flow capabilities of the formation, the response in production improvement may be only temporary.

It has been widely assumed that these mixed acid systems could be injected into a sandstone formation to dissolve clay at almost any depth from the wellbore, and that their reaction upon silica surfaces is so slow that little reaction takes place. A recent study (J. Pet. Tech., Vol. XXII, June 1970, p. 693) has shown that the reaction rate of mixed HCl—HF on clays is virtually instantaneous. Since clay is the mineral that usually causes reduction in fluid injection rates into sandstone formation, retarding the reaction rate of the acid mixture toward both sandstones and clays would be greatly beneficial. There are two types of mud damage: (1) Completion damage, which results from drilling mud permeating the pore spaces of the formation adjacent to the wellbore, which is generally limited to a zone extending about one inch from the wellbore, and (2) Natural damage, which results from a reduction in virgin permeability as a result of swelling or migration of sensitive clays which may cause plugging of the formation flow channels. Natural damage is usually thought to exist to a depth of 2 or 3 feet from the wellbore. However, it can extend 7 or 8 feet from the wellbore. One can see that when treating formations with natural clay damage, the production increase realized is dependent upon the distance which the hydrofluoric acid can be pumped into the formation before being spent. Furthermore, as the depth of damage increases, the need for an acid mixture which will attack the formation at a greater distance from the wellbore becomes more desirable.

One method suggested to overcome the above-mentioned disadvantage of the fast reaction of the acid solution in the vicinity of the wellbore has been the use of "retarded" acids which consist, for example, of mineral acids and an additive which emulsifies the acid, a combination of which affects the acidization rate. Although such emulsified mixtures can be displaced into the formation before substantial reaction occurs, such compositions have the inherent disadvantage in that when the emulsion breaks and they do react, they usually react swiftly, often unpredictably with the result that problems of cavitation and channeling develop. More importantly, the use of such emulsified retarded acid has been limited to conventional acidization processes with hydrochloric acid alone, which has no utility in the dissolution of silica or clays.

The use of cross-linked copolymers of polyvinylpyrrolidone and polyacrylamides, polyurethanes, etc. to give materials which are insoluble in aqueous mineral acid solutions is described in U.S. Pat. No. 3,380,529 to Hendrickson. Such insoluble, cross-linked polymers are utilized as agents for partially plugging channels developed during acidization treatment in order to effect acidic attack at greater distances from the wellbore. In U.S. Pat. No. 3,434,971 a similar acidization process is described in which a copolymer prepared by polymerizing acrylamide and N-vinylpyrrolidone in the presence of a cross-linking agent, such as N,N'-methylenebisacrylamide, is disclosed. These copolymers are insoluble in the aqueous mineral acid solutions employed in acidization operations and are utilized as dispersions in the acid solutions. Both of the previously mentioned acidization processes which utilize insoluble, cross-linked copolymers are distinctly different from the novel method of this invention in which a vinylpyrrolidone polymer soluble in aqueous mineral acid solutions is used.

The primary object of the present invention is to provide a process for the improved recovery of fluids and especially hydrocarbons from subterranean fluid-bearing formation by providing a process wherein a composition comprising an aqueous solution of a mineral acid, such as hydrochloric acid, and a fluorine-containing acid or salt and having dissolved therein a vinylpyrrolidone polymer is injected into a formation communicating between a producing well and an adjacent injection well, said formation containing sandstone and clay components and whereafter the acids and acid salts contained in the said composition reacts with the acid-soluble components of the formation to increase permeability and porosity of the formation thereby facilitating the flow of fluids therethrough.

SUMMARY OF THE INVENTION

In accordance with the present invention, there is provided a new and improved method for the recovery of hydrocarbons from subterranean hydrocarbon-bearing formations in which there is injected into the formation via an injection well drilled into a formation communicating with an adjacent producing well and containing sandstone and clay components, a composition comprising an acidic aqueous polymer solution, i.e., an aqueous solution of a mineral acid selected from the group consisting of hydrochloric and sulfuric acid and a fluorine-containing acid or salt and having dissolved therein a vinylpyrrolidone polymer which is capable of reacting with the formation components at a reduced rate and which acids and acid salts thereof subsequently react with the acid-soluble components of the formation to increase the permeability and porosity thereof thereby permitting a substantial increase of production of hydrocarbons from the formation via the production well.

A number of advantages result in treating subterranean hydrocarbon-bearing formation having sandstone and clay components therein with the acid aqueous polymer-containing compositions of this invention, namely:

1. The reaction rate of the acid with the formation acid-solubles, i.e., the sandstone and clay components, is greatly lessened. One of the most serious problems encountered in the use of mineral acids as acidizing agents, as previously mentioned, is the very rapid rate with which they react with such components in the formation with the result that the acid necessarily spends itself in the formation immediately adjacent the injection wellbore so that little beneficial effect is realized at any great distance from the bore within the formation under treatment.

2. The viscosity of the stimulation fluid is increased. Increasing the viscosity permits more uniform transmission of the fluid through the reservoir matrix and thus uniform permeability increase. In addition, fluid loss, or vertical leakage is minimized. This is especially important in stimulations wherein fracturing is desired since such leakage lessens the extent of fracture propagation.

3. The injection rate of the flood is increased. Acidization in-depth accomplished during stimulation greatly enhances the rate of injection.

DESCRIPTION OF THE INVENTION

The method of the present invention in its broadest embodiment comprises introducing via an injection well drilled into a hydrocarbon-bearing formation containing sandstone and clay components and communicating with a producing well a fluid composition comprising an acidic aqueous solution of a vinylpyrrolidone polymer in amounts sufficient to react with the sandstone and clay of formation so as to increase substantially the flow capability of the formation and to thereafter produce hydrocarbons from the said subterranean formation at an increased rate through the production well. The average molecular weight of the vinylpyrrolidone polymers utilized in the method of this invention generally will be from about 10,000 to about 1,000,000 or more and, preferably, from about 10,000 to about 400,000.

Highly advantageous results are realized in the recovery process of this invention when water-soluble vinylpyrrolidone polymers having recurring units of the formula:

(I) 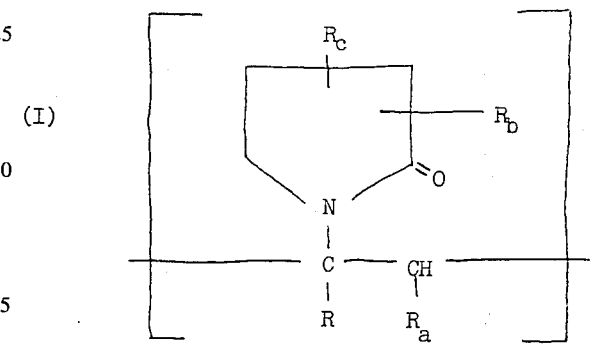

wherein R, $R_a$, $R_b$ and $R_c$ are independently selected from the group consisting of hydrogen and alkyl radicals having from 1 to 5 inclusive carbon atoms, are employed. Examples of alkyl radicals of 1 to 5 inclusive carbon atoms include methyl, ethyl, propyl, butyl, pentyl, and isomeric forms thereof. The sole limitation on the cited structure is that it be sufficiently soluble in the aqueous acid solution. Likewise, mixtures of these polymers may be employed. When R, $R_a$, $R_b$ and $R_c$ of Formula I above are each hydrogen, the resulting compound is polyvinylpyrrolidone, i.e., PVP or poly-N-vinyl-2-pyrrolidone, which is an especially useful polymer.

Preferably, the acidic aqueous treating composition of this invention injected into the hydrocarbon-bearing formation comprises an aqueous solution of about 5 to about 12 percent by weight of a mineral acid selected from the group consisting of hydrochloric and sulfuric from about 3 to about 7 percent by weight of hydrofluoric acid and which contains dissolved therein between about 0.5 to about 5 percent by weight based on the total solution weight of the water-soluble vinylpyrrolidone polymer.

The vinylpyrrolidone polymers employed show a high degree of compatibility (i.e., no reaction) with inorganic salt solutions of compounds such as magnesium chloride, calcium chloride, barium chloride, sodium chloride, etc. As expected, the intrinsic viscosity increases with concentration and molecular weight (degree of polymerization). One of the unique characteristics of the cited polymer lies in the large increase in viscosity in aqueous acidic solutions thereof as the acidity is increased.

In preparing the vinylpyrrolidone polymers employed in the novel treating compositions of this invention, a carboxylic acid amide of the formula:

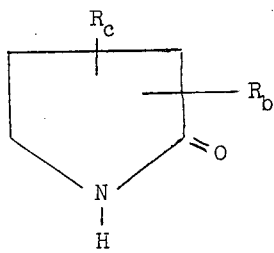

such as 2-pyrrolidone, 3-methyl-2-pyrrolidone, 4,4-diethyl-2-pyrrolidone, 5-isobutyl-2-pyrrolidone, 4-methyl-2-pyrrolidone, 3-ethyl-2-pyrrolidone, 3-methyl-5-ethyl-2-pyrrolidone, etc., is reacted with the acetylene or an acetylenic derivative of the formula:
$$RC \equiv CR_a$$
wherein R and $R_a$ have the same meaning as previously described under pressure at temperatures from about 130° to about 160°C and in the presence of the alkali metal salts of these acetylenic compounds as catalysts. This method is set forth in Kirk-Othmer, *Encyclopedia of Chemical Technology*, Second Edition, Vol. I, Interscience Publishers, New York, 1963, page 205. The polymerization of the resulting vinyl derivatives can be carried out by methods well known in the art. The vinylpyrrolidone polymers are also sometimes referred to as polyethenylpyrrolidinones.

The acidic polymer solutions employed in the process of this invention, preferably contain an inhibitor to prevent or greatly reduce corrosion attack on metals. A variety of such inhibitors are known in the art, e.g., certain compounds of arsenic, nitrogen or sulfur as described by Grebe et al. in U.S. Pat. No. 1,877,504. Likewise, rosinamine type inhibitors, as illustrated in U.S. Pat. No. 2,758,970 may be utilized. A small but effective amount of the inhibitor is employed which generally ranges from about 0.02 to about 1.5 percent by weight of the acidic aqueous polymer solution.

In the first step of preparing the acidic aqueous polymer composition of this invention, a solution containing from about 5 to about 12 percent by weight of a mineral acid, such as hydrochloric acid, in fresh water is prepared, after which sufficient hydrofluoric acid is added to form a solution having about 3 to about 7 percent by weight of hydrofluoric acid. An inhibitor to prevent corrosion on the metal equipment associated with the wells is usually added with mixing in the next step. The required amount of the polymer is then admixed with the aqueous acid solution employing a blender or other suitable mixing device whereupon the polymer dissolves at a rather rapid rate.

The process of this invention can be carried out with a wide variety of injection and production systems which will comprise one or more wells penetrating the producing strata or formation. Such wells may be located and spaced in a variety of patterns which are well-known to those skilled in the art. For example the so-called "line flood" pattern may be used, in which case the injection and producing systems are composed of rows of wells spaced from one another. The recovery zone, i.e., that portion of the producing formation from which hydrocarbons are displaced by the drive fluid to the production system, in this instance will be that part of the formation underlying the area between the spaced rows. Another pattern which is frequently used is the so-called "circular flood" in which the injection system comprises a central injection well while the production system comprises a plurality of production wells spaced about the injection well. Likewise, the injection and production systems each may consist of only a single well and here the recovery zone will be that part of the producing strata underlying an elliptical-like area between the two wells which is subject to the displacing action of the aqueous drive fluid. For a more elaborate description of such recovery patterns reference is made to Uren, L.C., *Petroleum Production Engineering-Oil Field Exploitation*, Second Edition, McGraw Hill Book Company, Inc., New York, 1939, and to U.S. Pat. Nos. 3,472,318 and 3,476,182.

In conducting the process of this invention, the acidic aqueous polymer solution prepared as described above is forced, usually via a suitable pumping system, down the well bore of an injection well and into the producing formation through which it is then displaced together with hydrocarbons of the formation in the direction of a production well. If the formation contains calcareous material a pre-flush of hydrochloric acid having a concentration of about 1 to about 5 or more weight percent may be forced through the producing formation to prevent the precipitation of $CaF_2$ formed by reaction of hydrofluoric acid on calcium carbonate. If the connate water of the formation is hard, but little limestone present, a pre-flush with fresh water will suffice. Conventional flooding may then be resumed, in which case injectivity is increased due to acidization in depth. The acidic aqueous polymer solution of this invention also may be applied in a modified water flood operation in which there is injected into the wellbore a slug of the acidic aqueous polymer solution preceded by a pad of fresh water or hydrochloric acid if required, which is forced under pressure into the subterranean formation. This first step is then followed by a similar injection step wherein a slug of an aqueous drive fluid, such as water, is injected, which is thereafter followed by a repetition of the two steps. This sequence may be repeated to give a continuous cyclic process. The size of the slugs may be varied within rather wide limits and will depend on a number of conditions, including the thickness of the formation, its characteristics and the conditions for the subsequent injection of the aqueous drive medium.

It should be understood that the concentration of the polymer the mineral acid and the hydrofluoric acid may be chosen to provide a displacing fluid of the desired rhelogical properties. Similarly, the appropriate molecular weight polymer is selected on the basis of the formation being treated as well as other operating conditions employed.

In another embodiment of this invention the acidic aqueous polymer solution is formed by adding to an aqueous solution of about 10 to about 18 weight percent of a mineral acid selected from the group consisting of hydrochloric and sulfuric acid and having dissolved therein from about 0.5 to about 5.0 percent by weight of a vinylpyrrolidone polymer from about 2.5 to about 10 percent by weight of a fluorine-containing salt selected from the group consisting of (A) fluoride salts such as ammonium fluoride, and lithium as well as (B)

acid fluorides as exemplified by ammonium acid fluoride ($NH_4HF_2$) and lithium acid fluoride ($LiHF_2$). The fluorine-containing salt when added to the solution of the mineral acid reacts to form hydrogen fluoride and the corresponding ammonium, or lithium chloride or sulfate. It has been found that a highly beneficial effect is achieved when the acidic aqueous polymer solution employed in the secondary recovery process of this invention contains, in addition to the mineral acid, hydrofluoric acid, and a polyvinylpyrrolidone, the ammonium or lithium ions derived from the fluorine-containing salt.

In order to promote effective acidization of the formation with the hydrofluoric acid at a considerable distance from the bore hole the introduction of the acidic aqueous polymer solution into the formation can be preceded by the injecting into the formation via the injection well of a slug of an aqueous solution containing from about 2.5 to about 10 weight percent of a fluorine-containing salt selected from the group consisting of (A) fluorides such as ammonium and lithium fluoride and (B) the corresponding acid fluorides. Since these fluoride salts are not especially reactive with the sandstone and clay components of the formation, it is possible to pressure inject solutions of these salts for a considerable distance into the formation. Following the injection of the aqueous fluoride salt solution there is injected into the formation a slug of an acidic aqueous polymer solution of the type previously described comprising from about 5 to about 12 percent by weight of a mineral acid selected from the group consisting of hydrochloric and sulfuric acid, from about 3 to about 7 percent by weight of hydrofluoric acid and which contains dissolved therein between about 0.5 to about 5 percent by weight of the water-soluble vinylpyrrolidone polymer. By using this technique the hydrofluoric acid content of the acidic aqueous solution is restrengthened by reaction of the initially injected fluoride salts with the excess hydrochloric acid in the second solution enhancing and augmenting upon the sand and clays in the formation at a considerable distance from the well borehole.

A series of experiments have been performed to evaluate the effectiveness of the disclosed acidic aqueous polymer solutions in retarding the reaction rate of siliceous material and formation clays. Aqueous mixtures of hydrofluoric and hydrochloric acids having polyvinylpyrrolidone dissolved therein were utilized in these experimental runs.

A. Preparation of Mixed Acid Solutions

The retarded acid systems tested were mixtures of hydrofluoric and hydrochloric acid containing dissolved polyvinylpyrrolidone (M.W. 360,000). These solutions were prepared by adding the appropriate weight of solid polyvinylpyrrolidone slowly with stirring to a solution of 6 percent by weight of hydrogen fluoride and 12 percent by weight of hydrochloric acid and stirring the mixture until the solid polymer had dissolved and a clear solution obtained.

B. Permeability Measurements

Permeability studies were made using Berea Sandstone which contained several weight percent clay. Cylindrical cores, measuring 2.20 cm. in both length and diameter, were extracted for 24 hours with a mixture of 50% ($^V$/V) methyl alcohol in benzene, dried in a vacuum oven at 100°C for 8 hours, allowed to cool in a desiccator, and then weighed.

Core permeabilities were measured in a conventional permeameter utilizing a Hassler assembly. Fluids were displaced from the reservoirs into the core with dry, pressurized nitrogen gas. The following procedure was utilized:

1. Core permeability to water was established by measuring flow rate at a known pressure.
2. A volume of 3M HCl was injected to remove formation carbonates.
3. Core permeability to water was re-established by again measuring flow rate at a known pressure.
4. A volume of above-described mixed acid solution in the presence and absence of the polymeric retardant was injected.
5. The mud acid was displaced from the core with water at 100 psig.
6. Core permeability to water was again established as before.
7. Steps 3–6 were repeated several times.

FIG. 1 which follows depicts the increase in permeability to water of two near identical Berea sandstone cores due to matrix dissolution by the acid systems. One was treated with a solution of 6 percent by weight of hydrofluoric acid and 12 percent by weight of hydrochloric acid and the second treated with a solution of 6 percent by weight of hydrofluoric acid, 12 percent by weight of hydrochloric acid and 1 percent by weight of polyvinylpyrrolidone (M.W. 360,000). In these experiments, both the volume of the acid system passed through the cores and the time of its exposure to the core were held constant. Thus, the permeability increase to water measured after each sequential treatment with each acid system is a measure of the quantity of matrix dissolved during the exposure time: The greater the permeability the greater quantity of matrix dissolved by the acid system. Therefore, the ability of the PVP to retard the reaction rate of the mud acid formulation upon the formation matrix and hence retard the rate of increase of permeability is shown in this figure. For example, after three equal exposure times to the respective acid systems (see A and A') the permeability of the Berea Sandstone core treated with the improved acidizing system is about 450 md (i.e., millidarcies) (A), while that of the uninhibited system is about 1200 md (A'). Similarly, after six equal exposure times (see B and B') the permeabilities are about 1000 md (B) and 2100 md (B') respectively.

C. Glass Slide Etching Measurements

A glass slide etching test was used to measure the rate of reaction between HF—HCl mixtures (with and without polyvinylpyrrolidone) and silica. The acid mixture was transferred volumetrically to a plastic jar, a weighed glass slide added to the acid, the jar sealed and reaction between mud acid and slide was allowed to proceed at room temperature for a predetermined period of time. Then the glass slide was removed from the jar, rinsed, dried and weighed. The extent of reaction was determined by weight loss of the slide.

Figure 2:
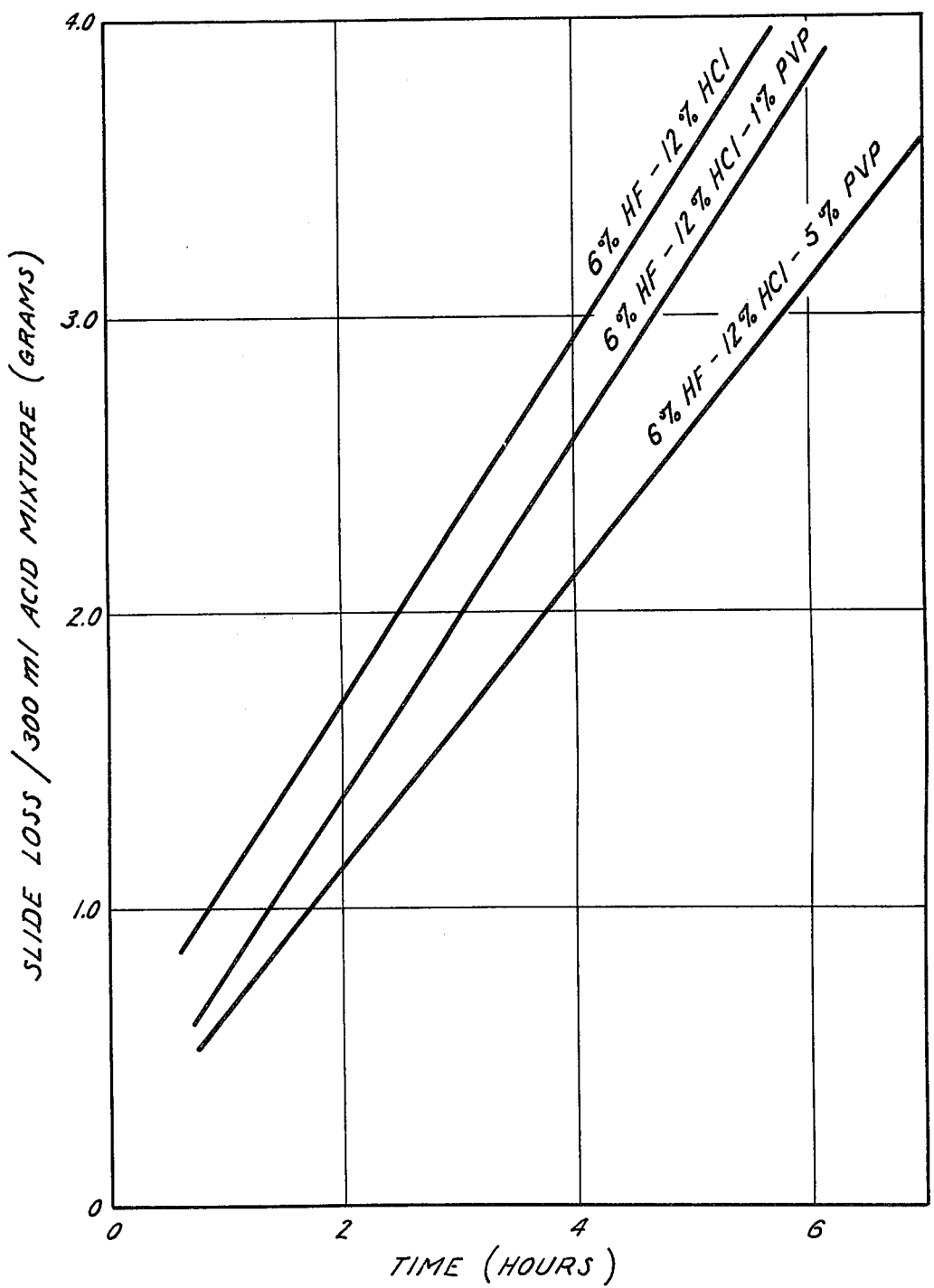

FIG. 2 which follows shows the diminution in reaction rate of mud acid (i.e., the mixed acid solution) upon silica surfaces effected by solubilization of 5 percent by weight of polyvinylpyrrolidone (M.W. 360,000) into the acid. For example, after four hours exposure about 36% less etching had occurred in the

What is claimed is:

1. A process for recovering hydrocarbons from a hydrocarbon-bearing formation containing acid-soluble components and having at least one injection well and at least one production well penetrating the said formation in fluid communication, which comprises displacing through the formation of a slug of a composition comprising an acidic aqueous polymer solution, thereafter injecting a slug of an aqueous drive fluid into the formation to drive the said polymer solution through said formation toward said production well and recovering hydrocarbons through the production well, said aqueous polymer solution comprising of from about 5 to about 12 percent by weight of a mineral acid selected from the group consisting of hydrochloric and sulfuric acid, from about 3 to about 7 percent by weight of hydrofluoric acid and having dissolved therein from about 0.5 to about 5 percent by weight of a vinylpyrrolidone polymer and wherein prior to the introduction of the acidic aqueous polymer solution there is first injected into the formation via said at least one injection well a slug of an aqueous solution containing about 2.5 to about 10 percent by weight of a fluorine-containing salt selected from the group consisting of (A) fluorides of the formula:
MF,
wherein M is selected from the group consisting of $NH_4^+$ and $Li^+$ and (B) acid fluorides of the formula:
$MHF_2$,
wherein M has the same meaning as described above.

2. The process of claim 1 wherein the said vinylpyrrolidone polymer comprises recurring units of the formula:

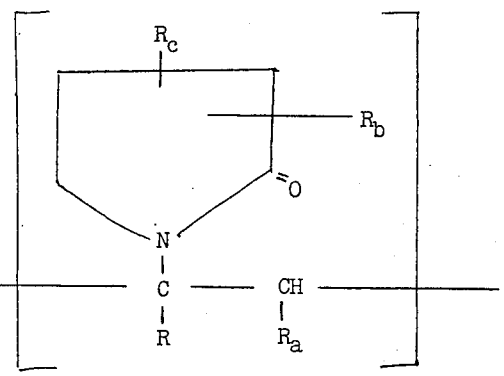

wherein R, $R_a$, $R_b$ and $R_c$ are independently selected from the group consisting of hydrogen and alkyl radicals having from 1 to 5 inclusive carbon atoms.

3. The process of claim 1 wherein the said acid is hydrochloric acid.

4. The process of claim 1 wherein the average molecular weight of the said polymer is about 10,000 to about 1,000,000.

5. The process of claim 1 wherein the said polymer is polyvinylpyrrolidone having an average molecular weight of from about 10,000 to about 1,000,000.

6. The process of claim 1 wherein the said fluorine-containing salt is a fluoride of the formula:
MF,
wherein M is selected from the group consisting of $NH_4^+$, and $Li^+$.

7. The process of claim 1 wherein the fluorine-containing salt is an acid fluoride of the formula:
$MHF_2$,
wherein M is selected from the group consisting of $NH_4^+$ and $Li^+$.

* * * * *